US008553264B2

(12) United States Patent
Tsutsumi

(10) Patent No.: US 8,553,264 B2
(45) Date of Patent: Oct. 8, 2013

(54) INFORMATION PROCESSING INCLUDING SPECIFYING A PRINTER TO EXECUTE A PRINT PROCESS OF A STORED JOB

(75) Inventor: Kensuke Tsutsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 12/957,241

(22) Filed: Nov. 30, 2010

(65) Prior Publication Data

US 2011/0157631 A1 Jun. 30, 2011

(30) Foreign Application Priority Data

Dec. 28, 2009 (JP) ................................ 2009-298834

(51) Int. Cl.
*G06F 3/12* (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS 7,236,262 B2 6/2007 Matsuo
7,916,330 B2 3/2011 Wada et al.
8,213,033 B2 7/2012 Choi et al.
2002/0054320 A1* 5/2002 Ogino .......................... 358/1.15
2002/0163665 A1* 11/2002 Iwata et al. .................. 358/1.15
2005/0005047 A1 1/2005 Keeney et al.
2010/0103453 A1 4/2010 Tsutsumi

FOREIGN PATENT DOCUMENTS

CN 1629828 A 6/2005
CN 1825272 A 8/2006
CN 101038537 A 9/2007
JP 2002091732 A 3/2002

OTHER PUBLICATIONS

U.S. Appl. No. 12/958,327, filed Dec. 1, 2010, Kensuke Tsutsumi.
European Search Report dated Feb. 6, 2013 issued in corresponding European Patent Application No. 10196644.8.
Chinese Office Action dated Apr. 3, 2013 issued in corresponding Chinese Patent Application No. 201010621820.4.

* cited by examiner

*Primary Examiner* — Qian Yang
(74) *Attorney, Agent, or Firm* — Fitzpatrick, Cella, Harper & Scinto

(57) ABSTRACT

An information processing apparatus which stores a job generated by a printer driver in memory unit, and specifies a printer to execute a print process of the stored job in accordance with a request from a client, comprises: determination unit for determining whether a job for which a print instruction is issued by the request is generated by a generic driver; device type specification unit for specifying a device type of a printer capable of printing the job for which the print instruction is issued, based on setting information of the job, when the determination unit determines that the job is generated by the generic driver; and printer specification unit for specifying, as the printer capable of printing the job for which the print instruction is issued, a printer corresponding to the printer information which is managed by a management unit and matches the device type specified.

8 Claims, 14 Drawing Sheets

FIG. 9A

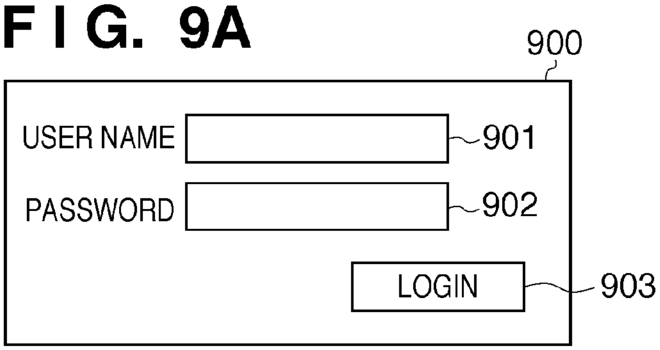

FIG. 9B

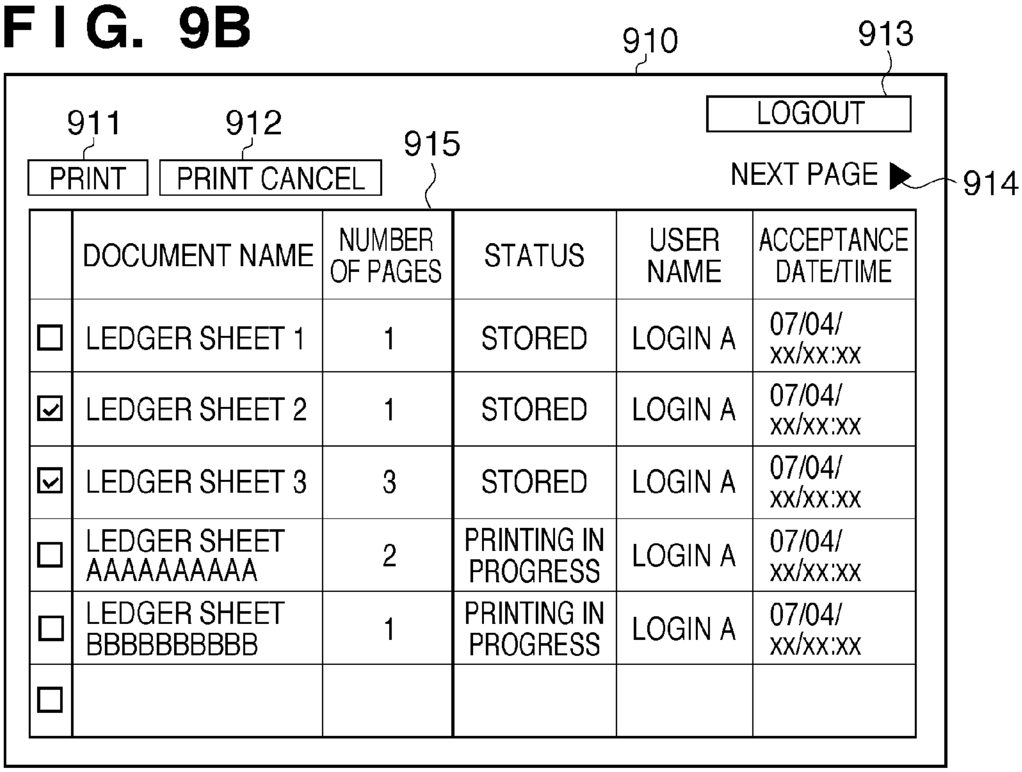

FIG. 9C

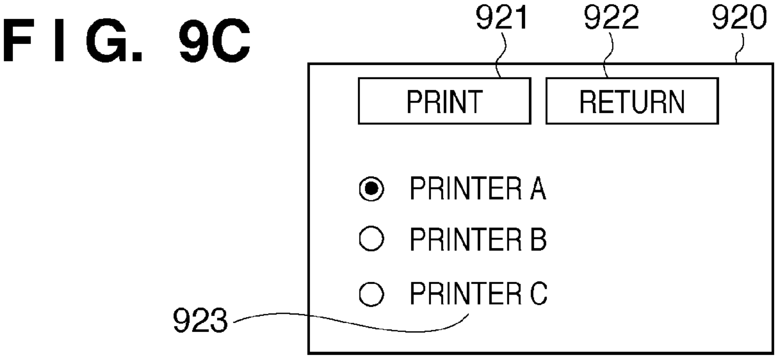

USER NAME [_____] ~901
PASSWORD [_____] ~902
[ LOGIN ] ~903

(900)

(910) [ LOGOUT ] ~913
[ PRINT ] (911)  [ PRINT CANCEL ] (912)   NEXT PAGE ▶ ~914
(915)

| | DOCUMENT NAME | NUMBER OF PAGES | STATUS | USER NAME | ACCEPTANCE DATE/TIME |
|---|---|---|---|---|---|
| ☐ | LEDGER SHEET 1 | 1 | STORED | LOGIN A | 07/04/ xx/xx:xx |
| ☑ | LEDGER SHEET 2 | 1 | STORED | LOGIN A | 07/04/ xx/xx:xx |
| ☑ | LEDGER SHEET 3 | 3 | STORED | LOGIN A | 07/04/ xx/xx:xx |
| ☐ | LEDGER SHEET AAAAAAAAAA | 2 | PRINTING IN PROGRESS | LOGIN A | 07/04/ xx/xx:xx |
| ☐ | LEDGER SHEET BBBBBBBBBB | 1 | PRINTING IN PROGRESS | LOGIN A | 07/04/ xx/xx:xx |
| ☐ | | | | | |

(920)
[ PRINT ] (921)  [ RETURN ] (922)

● PRINTER A
○ PRINTER B
○ PRINTER C
(923)

| | | |
|---|---|---|
| 1201 | A3 COLOR JOB | A3 COLOR PRINTER |
| 1202 | A4 COLOR JOB | A3 COLOR PRINTER AND A4 COLOR PRINTER |
| 1203 | A3 MONOCHROME JOB | A3 COLOR PRINTER AND A3 MONOCHROME PRINTER |
| 1204 | A4 MONOCHROME JOB | A3 COLOR PRINTER, A4 COLOR PRINTER, A3 MONOCHROME PRINTER, AND A4 MONOCHROME PRINTER |

TABLE FOR DETERMINING PRINTER CAPABLE OF PRINTING JOB

| | | |
|---|---|---|
| 1211 | A3 COLOR PRINTER | A3 COLOR JOB, A4 COLOR JOB, A3 MONOCHROME JOB, AND A4 MONOCHROME JOB |
| 1212 | A4 COLOR PRINTER | A4 COLOR JOB AND A4 MONOCHROME JOB |
| 1213 | A3 MONOCHROME PRINTER | A3 COLOR JOB AND A4 MONOCHROME JOB |
| 1214 | A4 MONOCHROME PRINTER | A4 MONOCHROME JOB |

TABLE FOR DETERMINING PRINTER CAPABLE OF PRINTING JOB

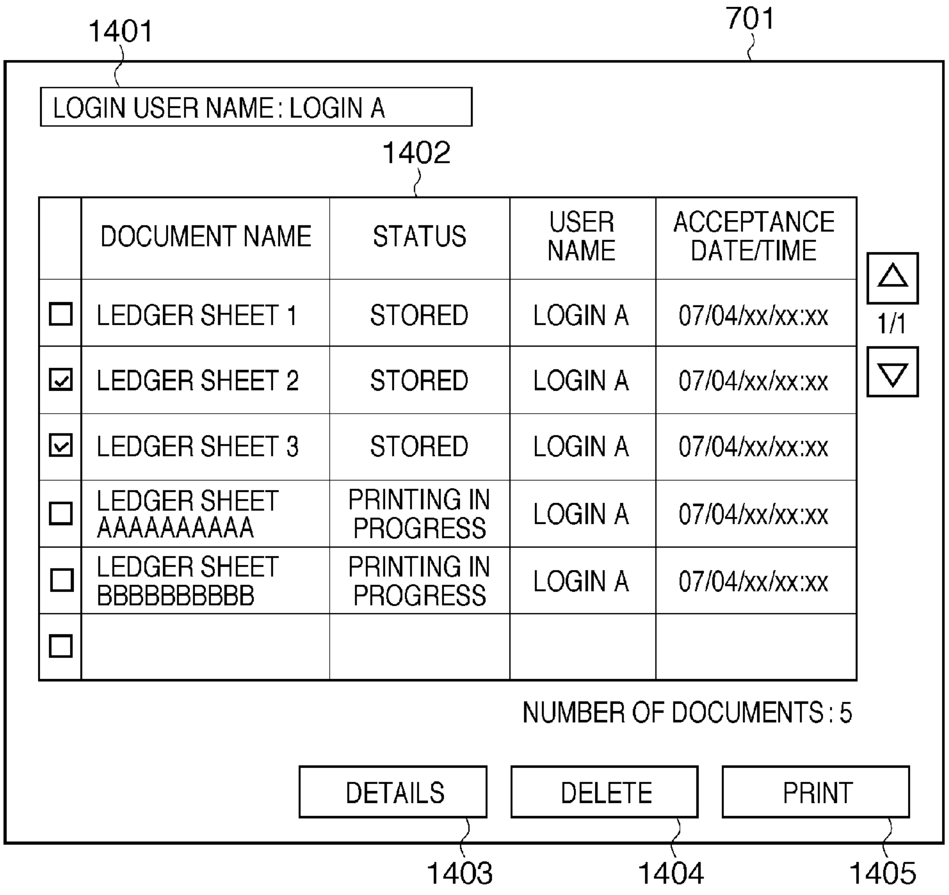

FIG. 14

| | DOCUMENT NAME | STATUS | USER NAME | ACCEPTANCE DATE/TIME |
|---|---|---|---|---|
| ☐ | LEDGER SHEET 1 | STORED | LOGIN A | 07/04/xx/xx:xx |
| ☑ | LEDGER SHEET 2 | STORED | LOGIN A | 07/04/xx/xx:xx |
| ☑ | LEDGER SHEET 3 | STORED | LOGIN A | 07/04/xx/xx:xx |
| ☐ | LEDGER SHEET AAAAAAAAAA | PRINTING IN PROGRESS | LOGIN A | 07/04/xx/xx:xx |
| ☐ | LEDGER SHEET BBBBBBBBBB | PRINTING IN PROGRESS | LOGIN A | 07/04/xx/xx:xx |
| ☐ | | | | |

LOGIN USER NAME: LOGIN A

1/1

NUMBER OF DOCUMENTS: 5

DETAILS  DELETE  PRINT

INFORMATION PROCESSING INCLUDING SPECIFYING A PRINTER TO EXECUTE A PRINT PROCESS OF A STORED JOB

BACKGROUND OF THE INVENTION

1. Field of the Invention

The present invention relates to an information processing apparatus, a network device, a system, a control method, and a computer-readable medium. The present invention more particularly relates to a technique of specifying a printer that prints a job to be printed, after a PDL job generated by a generic driver is stored in a print server.

2. Description of the Related Art

A generic driver is a printer driver that is generically common to print devices such as a color multifunction peripheral, a monochrome multifunction peripheral, and an single-function peripheral (SFP), and can output print data described in a PDL (Page Description Language) to these devices as a print job. On the other hand, a conventional driver that is unique for each device model is called a specific driver. In a print server which starts to print a print job after storing and temporarily suspending it, a printer is selected upon a print start request.

Note that a print job generated by a specific driver can be printed only by a printer related to the driver. On the other hand, in generating a print job by a generic driver, the type of printer used to carry out the print job need not be considered. Also, in the latter case, a printer corresponding to the generic driver can be selected at the start of printing, and this realizes a more flexible print system.

In printing that uses a conventional generic driver, a printer capable of printing a job is specified from information on a network in job generation, in accordance with the type of PDL (for example, PS or PCL) (see Japanese Patent Laid-Open No. 2002-91732).

Print data generated by a generic driver is a job generic for a plurality of device models, but nonetheless print data generated upon, for example, A3 color setting cannot be printed by an A4-monochrome-specific printer. That is, a printer capable of printing a job differs depending on job setting (for example, an A4, A3, monochrome, or color job).

A certain print system temporarily stores print data in a print server and thereafter starts to print. In this system, the user selects print data stored in the print server and selects a printer from a list of printers capable of printing this data to issue a print instruction, and the selected data is output to the printer as a job to start its printing. In such a system, it is a conventional practice to specify a printer, capable of printing print data generated by a specific driver, by referring to the name of the driver that has generated this data.

However, as described earlier, a printer capable of printing print data generated by a generic driver differs depending on its setting (A4, A3, monochrome, or color data), so a printer capable of printing this data cannot be specified by referring to the driver name.

SUMMARY OF THE INVENTION

The present invention provides a method which can specify a printer, capable of printing jobs (print data) stored in the server of the above-mentioned system, upon an actual print request even if the jobs include a job generated by a generic driver.

According to one aspect of the present invention, there is provided an information processing apparatus which stores a job generated by a printer driver in memory unit, and specifies a printer to execute a print process of the stored job in accordance with a request from a client, comprising: storage unit for receiving a job generated by a generic driver corresponding to printers of a plurality of device types, and a job generated by a specific driver corresponding to a specific printer, and storing the received jobs in the memory unit; management unit for managing printer information including a device type of a printer; determination unit for determining whether a job for which a print instruction is issued by the request is generated by a generic driver; device type specification unit for specifying a device type of a printer capable of printing the job for which the print instruction is issued, based on setting information of the job, when the determination unit determines that the job is generated by the generic driver; and printer specification unit for specifying, as the printer capable of printing the job for which the print instruction is issued, a printer corresponding to the printer information which is managed by the management unit and matches the device type specified by the device type specification unit, wherein the printer specification unit specifies, as the printer capable of printing the job for which the print instruction is issued, a printer corresponding to a specific driver which has generated the job, when it is determined that the job for which the print instruction is issued is generated by the specific driver.

According to one aspect of the present invention, there is provided an information processing apparatus which stores a job generated by a printer driver in memory unit, and specifies a job which can be printed by a printer in accordance with a request from the printer, comprising: storage unit for receiving a job generated by a generic driver corresponding to printers of a plurality of device types, and a job generated by a specific driver corresponding to a specific printer, and storing the received jobs in the memory unit; management unit for managing printer information including a device type of a printer; and device type specification unit for specifying a device type of the printer which has issued the request, based on the printer information managed by the management unit, (1) determining whether the job which is generated by the generic driver and stored in the memory unit can be printed by the printer of the specified device type, (2) determining whether the job which is generated by the specific driver and stored in the memory unit can be printed by the printer based on driver information of the job, and specifying a job which can be printed by the printer from the jobs stored in the memory unit, wherein the printer executes a print process of the specified job.

According to another aspect of the present invention, there is provided a network device which communicates with an information processing apparatus that stores a plurality of jobs generated by a printer driver in memory unit, comprising: reception unit for receiving information used to select a job to undergo a print process from the plurality of jobs stored in the memory unit; control unit for displaying a list of jobs on display unit based on the information received by the reception unit; and requesting unit for issuing a print request to the information processing apparatus to execute a print process of a job selected from the displayed list of jobs, wherein the selected job includes a job generated by a generic driver corresponding to printers of a plurality of device types, and a device type of a printer capable of printing the job generated by the generic driver is specified based on setting information of the job, and a printer corresponding to the specified device type executes a print process of the job.

According to another aspect of the present invention, there is provided a system which includes an information processing apparatus that stores a job generated by a printer driver in memory unit, and is configured to execute a print process of the stored job using a printer in accordance with a print request, comprising: storage unit for storing, in the memory unit, a job generated by a generic driver corresponding to printers of a plurality of device types, and a job generated by a specific driver corresponding to a specific printer; management unit for managing printer information including a device type of a printer; and device type specification unit for specifying a device type of a printer capable of printing the job which is generated by the generic driver and stored in the memory unit, wherein a printer corresponding to the printer information which is managed by the management unit and matches the device type specified by the device type specification unit executes a print process of the job generated by the generic driver.

According to another aspect of the present invention, there is provided a control method for an information processing apparatus which stores a job generated by a printer driver in memory unit, and specifies a printer to execute a print process of the stored job in accordance with a request from a client, comprising: a storage step of receiving a job generated by a generic driver corresponding to printers of a plurality of device types, and a job generated by a specific driver corresponding to a specific printer, and storing the received jobs in the memory unit; a management step of managing printer information including a device type of a printer; a determination step of determining whether a job for which a print instruction is issued by the request is generated by a generic driver; a device type specification step of specifying a device type of a printer capable of printing the job for which the print instruction is issued, based on setting information of the job, when it is determined in the determination step that the job is generated by the generic driver; and a printer specification step of specifying, as the printer capable of printing the job for which the print instruction is issued, a printer corresponding to the managed printer information which matches the device type specified in the device type specification step, wherein in the printer specification step, a printer corresponding to a specific driver which has generated the job for which the print instruction is issued is specified as the printer capable of printing the job, when it is determined that the job for which the print instruction is issued is generated by the specific driver.

According to another aspect of the present invention, there is provided a control method for an information processing apparatus which stores a job generated by a printer driver in memory unit, and specifies a job which can be printed by a printer in accordance with a request from the printer, comprising: a storage step of receiving a job generated by a generic driver corresponding to printers of a plurality of device types, and a job generated by a specific driver corresponding to a specific printer, and storing the received jobs in the memory unit; a management step of managing printer information including a device type of a printer; and a device type specification step of specifying a device type of the printer which has issued the request, based on the managed printer information, (1) determining whether the job which is generated by the generic driver and stored in the memory unit can be printed by the printer of the specified device type, (2) determining whether the job which is generated by the specific driver and stored in the memory unit can be printed by the printer based on driver information of the job, and specifying a job which can be printed by the printer from the jobs stored in the memory unit, wherein the printer executes a print process of the specified job.

According to another aspect of the present invention, there is provided a control method for a system which includes an information processing apparatus that stores a job generated by a printer driver in memory unit, and is configured to execute a print process of the stored job using a printer in accordance with a print request, comprising: a storage step of storing, in the memory unit, a job generated by a generic driver corresponding to printers of a plurality of device types, and a job generated by a specific driver corresponding to a specific printer; a management step of managing printer information including a device type of a printer; and a device type specification step of specifying a device type of a printer capable of printing the job which is generated by the generic driver and stored in the memory unit, wherein a printer corresponding to the managed printer information which matches the device type specified in the device type specification step executes a print process of the job generated by the generic driver.

According to another aspect of the present invention, there is provided a control method for a network device which communicates with an information processing apparatus that stores a plurality of jobs generated by a printer driver in memory unit, comprising: a reception step of receiving information used to select a job to undergo a print process from the plurality of jobs stored in the memory unit; a control step of displaying a list of jobs on display unit based on the information received in the reception step; and a requesting step of issuing a print request to the information processing apparatus to execute a print process of a job selected from the displayed list of jobs, wherein the selected job includes a job generated by a generic driver corresponding to printers of a plurality of device types, and a device type of a printer capable of printing the job generated by the generic driver is specified based on setting information of the job, and a printer corresponding to the specified device type executes a print process of the job.

According to the present invention, it is possible to specify a printer, capable of printing jobs (print data) stored in the server of the above-mentioned system, upon an actual print request based on setting information such as the device type and driver name of the stored job even if the jobs include a job generated by a generic driver.

Further features of the present invention will become apparent from the following description of exemplary embodiments with reference to the attached drawings.

BRIEF DESCRIPTION OF THE DRAWINGS

FIGS. 9A, 9B, and 9C are views showing examples of screens generated by a Web server according to the first embodiment;

FIGS. 12A and 12B are views showing tables for determining whether printing is possible according to the embodiment;

FIG. 14 is a view showing an example of a screen generated by a pull print application according to the second embodiment.

DESCRIPTION OF THE EMBODIMENTS

Best modes for carrying out the present invention will be described below with reference to the accompanying drawings. Note that in a system according to the present invention, a network device including a display means and connected to a network, such as a client or a printer, requests an external server in the system to output a job to the printer, thereby executing desired printing.

First Embodiment

<System Configuration>

Figure 1:
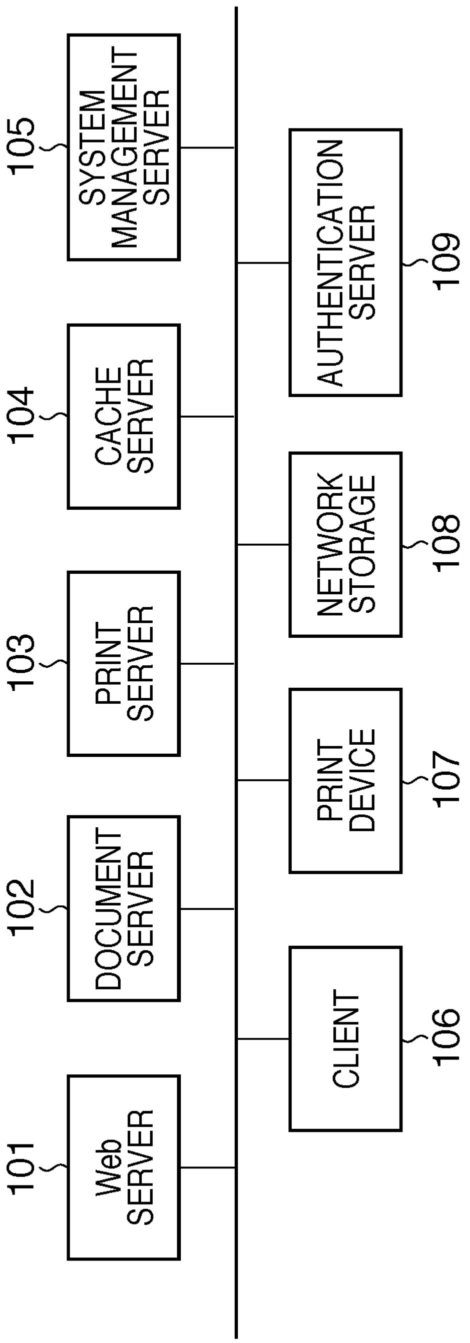
FIG. 1 is a block diagram showing the configuration of a system according to an embodiment.

FIG. 1 is a block diagram showing an example of the configuration of a system according to the present invention. Referring to FIG. 1, a Web server 101, document server 102, print server 103, cache server 104, system management server 105, client 106, printer 107, network storage 108, and authentication server 109 are connected via a communication line. The communication line is a so-called communication network. In this embodiment, the communication network is, for example, a TCP/IP network such as the Internet or an intranet, and a data link layer is implemented by one or a combination of, for example, a LAN, a WAN, a telephone line, a dedicated digital line, an ATM, a frame relay line, a cable television line, and a data broadcasting wireless line. The various types of servers may have different means for communication with the respective devices as long as they can transmit/receive data via the communication line. Examples of these communication means include a communication means from the client 106 to the Web server 101, those from the print server 103 to the printer 107 and network storage 108, and those between the respective servers. Although the various types of servers are shown as separate function-specific devices in this embodiment, the present invention is not limited to this, and these servers may be implemented by a device having all of these functions.

<Hardware Configuration of Computer>

Figure 2:
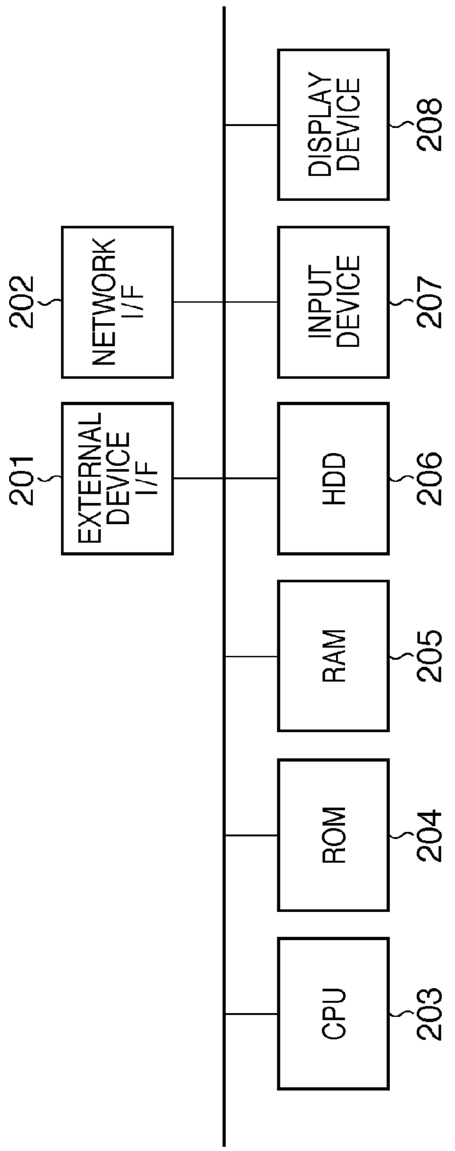
FIG. 2 is a block diagram showing the hardware configuration of a computer according to the embodiment.

FIG. 2 is a block diagram showing the basic hardware configuration of each of the Web server 101, document server 102, print server 103, cache server 104, system management server 105, client 106, network storage 108, and authentication server 109. These devices need only have a configuration which can implement the function of a general information processing apparatus. Referring to FIG. 2, an external device I/F 201, network I/F 202, CPU 203, ROM 204, RAM 205, HDD 206, input device 207, and display device 208 are connected to each other via a system bus. The system bus includes, for example, a PCI bus, AGP bus, and memory bus. Note that connection chips between the respective buses and input/output interfaces between the constituent elements, such as so-called SCSIs or ATAPIs, are not shown in FIG. 2.

The CPU 203 reads a program stored in the HDD 206 into the RAM 205, and executes a process based on this program, thereby managing each process on the computer. The ROM 204 stores programs and data that are associated with each process of the device, and is not rewritable. The RAM 205 can electrically store temporary data that is associated with each process of the device, and is rewritable. The programs and data that are associated with each process of the device, and the temporary data that is associated with this process, for example, are stored in the HDD 206. The input device 207 includes a keyboard and pointing device which accept an instruction input to the device. The display device 208 displays the operation status of the device, and information output by each program running on the device. The network I/F 202 connects to a LAN and the Internet via a network, and exchanges information with the outside. The external device I/F 201 can connect, for example, to an external storage device.

<Hardware Configuration of Printer>

Figure 3:
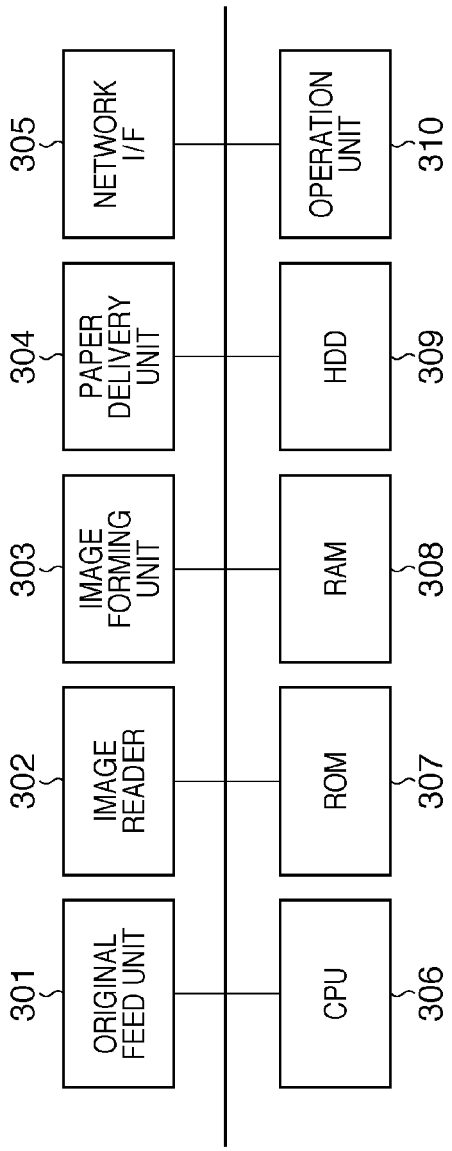
FIG. 3 is a block diagram showing the hardware configuration of a printer according to the embodiment.

FIG. 3 is a block diagram showing an example of the hardware configuration of the printer 107. Referring to FIG. 3, an original feed unit 301, image reader 302, image forming unit 303, paper delivery unit 304, network I/F 305, CPU 306, ROM 307, RAM 308, HDD 309, and operation unit 310 are connected to each other via a system bus. The system bus includes, for example, a PCI bus, AGP bus, and memory bus. Note that connection chips between the respective buses, and input/output interfaces between the constituent elements, such as so-called SCSIs or ATAPIs, are not shown in FIG. 3.

The image reader 302 reads an original using the original feed unit 301. The image reader 302 and image forming unit 303 convert a read original or data received via a network into a print image, and print it out. The paper delivery unit 304 delivers the printout paper, and performs processes such as sorting and stapling for this paper. The network I/F 305 can connect to a LAN and a WAN via a network, and exchanges information with the outside. The CPU 306 reads a program stored in the ROM 307 or HDD 309 into the RAM 308, and executes a process based on this program, thereby managing each process on the device (printer). The ROM 307 as a nonvolatile memory means stores programs and data that are associated with each process of the device. The rewritable RAM 308 electrically stores temporary data that is associated with each process of the device. The HDD 309 stores, for example, the programs and data that are associated with each process of the device, and the temporary data that is associated with this process. The operation unit 310 displays a screen and accepts a user operation instruction via the screen.

[Web Server 101]

Figure 4A:
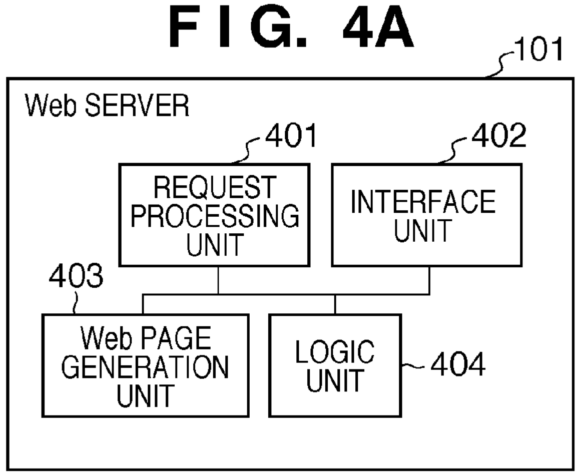
FIGS. 4A, 4B, 4C, 4D, and 4E are block diagrams showing the software configurations of respective servers according to the embodiment.

FIG. 4A is a block diagram showing the software configuration of the Web server 101. Note that each software module is stored in the HDD 206 shown in FIG. 2, and is loaded into the RAM 205 and executed by the CPU 203, as described earlier.

The Web server 101 includes a request processing unit 401, interface unit 402, Web page generation unit 403, and logic unit 404. The request processing unit 401 receives requests from the client 106 and a pull print application 602, and sends back responses to them. The request processing unit 401 sends back a Web page to the client 106 as a response to the request from it, and sends back information formatted in XML to the client 106 as a response to the request from it. The interface unit 402 processes communication with the document server 102, cache server 104, system management server 105, and authentication server 109. The logic unit 404 executes a process in accordance with a request accepted by the request processing unit 401.

Examples of requests to the Web server 101 include login and print start/print cancel/display/deletion of a stored document. In accordance with the requests, the Web server 101 acquires data from each server or issues a document operation request to another server, and sends back the results of these operations to these servers as responses.

[Document Server 102]

Figure 4B:
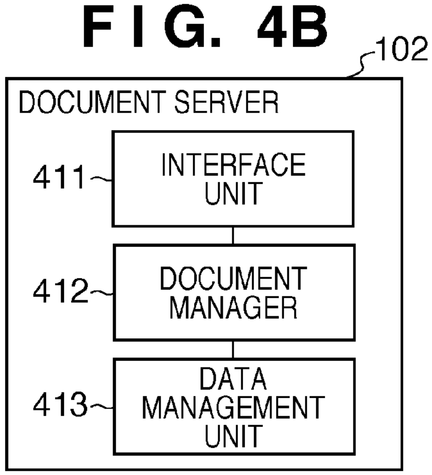

FIG. 4B is a block diagram showing the software configuration of the document server 102. Note that each software module is stored in the HDD 206 shown in FIG. 2, and is loaded into the RAM 205 and executed by the CPU 203, as described earlier.

The document server 102 includes an interface unit 411, document manager 412, and data management unit 413. The interface unit 411 processes communication with the Web server 101, print server 103, and cache server 104. The document manager 412 executes a process in accordance with a request accepted by the interface unit 411. The data management unit 413 manages document information 500 in the form of a database, and updates it in accordance with an instruction from the document manager 412. The database is stored in the HDD 206 shown in FIG. 2. Also, device model information 530 and printer information 540 are periodically acquired from the system management server 105, and stored on the RAM 205.

[Print Server 103]

Figure 4C:
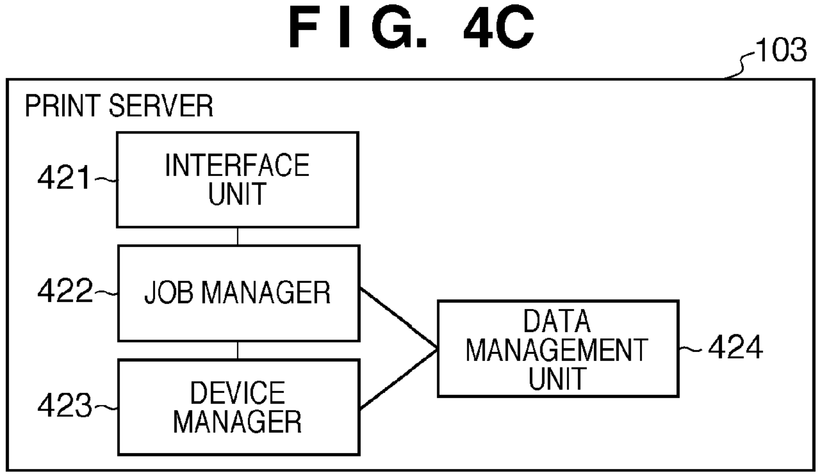

FIG. 4C is a block diagram showing the software configuration of the print server 103. Note that each software module is stored in the HDD 206 shown in FIG. 2, and is loaded into the RAM 205 and executed by the CPU 203, as described earlier.

The print server 103 includes an interface unit 421, job manager 422, device manager 423, and data management unit 424. The interface unit 421 processes communication with the document server 102, cache server 104, and system management server 105. The job manager 422 reads out print document data stored in the network storage 108 and transmits it to the printer 107, in accordance with a request accepted by the interface unit 411. Also, the job manager 422 monitors a print job of the printer 107, and tracks the print job until printing is completed. The device manager 423 monitors the status of the printer 107. The data management unit 424 manages job information 520 in the form of a database, and updates it in accordance with an instruction from the job manager 422 or device manager 423. The database is stored in the HDD 206 shown in FIG. 2. Also, the device model information 530 and printer information 540 that are necessary for printing are periodically acquired from the system management server 105, and stored on the RAM 205. Note that a print job to be executed is defined in a PDL (Page Description Language) based on a print instruction, and generated by a generic driver or a specific driver. Also, a print job (PDL job) to be executed herein will be simply referred to as a job unless otherwise specified. Moreover, the type of PDL used for description is not particularly limited.

[Cache Server 104]

Figure 4D:
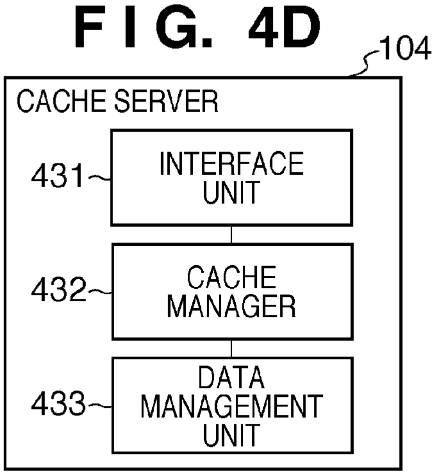

FIG. 4D is a block diagram showing the software configuration of the cache server 104. Note that each software module is stored in the HDD 206 shown in FIG. 2, and is loaded into the RAM 205 and executed by the CPU 203, as described earlier.

The cache server 104 includes an interface unit 431, cache manager 432, and data management unit 433. The interface unit 431 processes communication with the Web server 101, document server 102, cache server 104, and system management server 105. The cache manager 432 executes a process in accordance with a request accepted by the interface unit 431. The data management unit 433 manages caches of document information 500, job information 520, device model information 530, and printer information 540 in the form of a database. The data management unit 433 updates these data in accordance with an instruction from the cache manager 432. The database is stored in the HDD 206 shown in FIG. 2.

The document information 500, job information 520, device model information 530, and printer information 540 held in the cache server 104 are caches. The pieces of information held in the cache server 104 are equivalent to those managed by the document server 102, print server 103, and system management server 105. In updating the pieces of information managed by the document server 102, print server 103, and system management server 105, the cache server 104 is also notified of the updating. The caches managed by the cache server 104 are updated in accordance with the update notification.

[System Management Server 105]

Figure 4E:
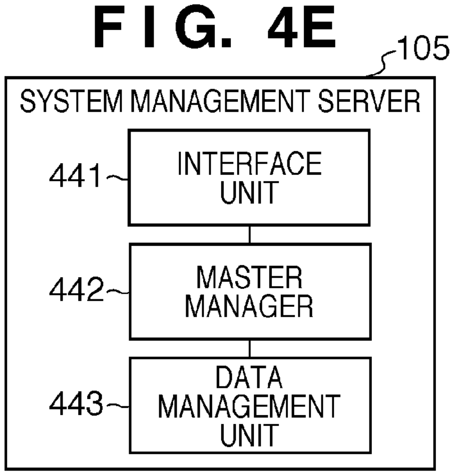

FIG. 4E is a block diagram showing the software configuration of the system management server 105. Note that each software module is stored in the HDD 206 shown in FIG. 2, and is loaded into the RAM 205 and executed by the CPU 203, as described earlier.

The system management server 105 includes an interface unit 441, master manager 442, and data management unit 443. The interface unit 441 processes communication with the Web server 101, document server 102, print server 103, and cache server 104. The master manager 442 executes a process in accordance with a request accepted by the interface unit 441. The data management unit 443 manages caches of the device model information 530 and printer information 540 in the form of a database, and updates these data in accordance with an instruction from the master manager 442. The database is stored in the HDD 206 shown in FIG. 2.

[Client 106]

The client 106 typically is, for example, a desktop personal computer, a notebook-sized personal computer, a mobile personal computer, or a PDA (Personal Data Assistant), but may be a cellular phone which includes the execution environment of a program. The client 106 includes a Web browser as a user interface application, and can access the Web server 101 via the Web browser.

[Printer 107]

The printer 107 is a printer (for example, a multifunction peripheral or a laser printer) which can be connected to a network and executes a print process. Although only a single printer 107 is shown in FIG. 1 for the sake of convenience, the present invention is not limited to this, and a plurality of printers of different models may be provided on the system.

[Network Storage 108]

The network storage 108 is a storage which can be directly connected to a network, such as a SAN (Storage Area Network) or a NAS (Network Attached Storage). In this embodiment, a NAS, for example, is used as the network storage 108. The network storage 108 holds print document data related to the document information 500.

[Authentication Server 109]

The authentication server 109 is a server which supports a protocol such as LDAP and provides a directory service, and manages user information in the system. The authentication server 109 performs user authentication in response to a request from the Web server 101, and sends back authentication information to it.

<Data Structure>

A data structure used in this embodiment will be described next. Note that the data structure described herein is merely an example, and the present invention is not limited to the information shown in this example.

[Document Information 500]

Figure 5A:
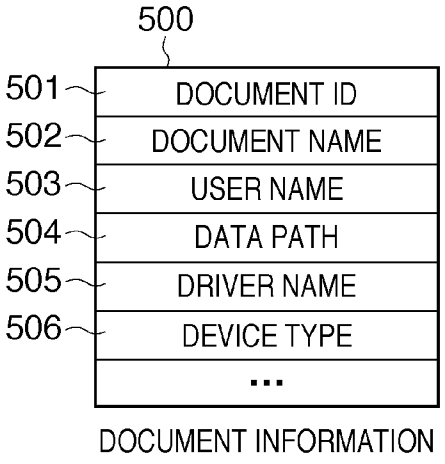
FIGS. 5A, 5B, 5C, and 5D are tables showing the data structures of various types of data according to the embodiment.

FIG. 5A is a table showing the document information 500, which is managed by the document server 102 and cached by the cache server 104. The document server 102 stores the document information 500 upon document registration acceptance.

The document information 500 includes a document ID 501, document name 502, user name 503, data path 504, driver name 505, and device type 506. The document ID 501 is the identifier of a stored document, and is issued and registered in document registration by the document server 102. The document name 502 is a document name given by the user. The user name 503 is the account name of the user who has registered the document. The data path 504 is a path in which print data related to the document is stored.

The driver name 505 is the name of a printer driver which has generated the print data. The device type 506 is set especially when a generic driver has generated the print data. In this case, information such as A3 color, A3 monochrome, A4 color, or A4 monochrome is set as a device type corresponding to the printer functions (for example, the paper size and color printing).

The document server 102 analyzes print data generated by a generic driver in document registration, and registers the device type 506 based on information embedded in it. The device type is embedded in the head field of the print data, so not all data need be analyzed. However, the device type may be specified (device type specification) by analyzing all data (for example, other setting information). Although four device types are defined in this embodiment, the present invention is not limited to this, and other device types may be defined in accordance with various types of print settings such as the paper size and post-processing setting (for example, stapling) of a job.

[Job Information 520]

Figure 5B:
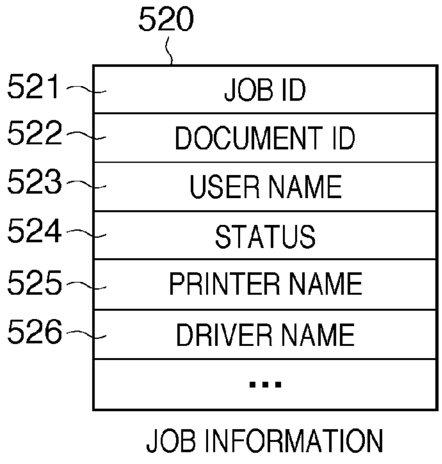

FIG. 5B is a table showing the job information 520, which is managed by the print server 103 and cached by the cache server 104. The print server 103 stores the job information 520 upon print request acceptance.

The job information 520 includes a job ID 521, document ID 522, user name 523, status 524, printer name 525, and driver name 526. The job ID 521 is the identifier of a job, and is issued and registered by the print server 103 upon print request acceptance. The document ID 522 is the same as that of the document information 500. The user name 523 is that of the user who has executed printing. The status 524 is the status of a job. The status includes a "standby" status in which a job is standing by to be printed, a "transfer in progress" status in which data is being transferred to the printer 107, and a "printing in progress" status in which printing is being executed by the printer 107. The printer name 525 is the name of a printer which prints the job. The driver name 526 is the name of a driver having been used for print data generation.

[Device Model Information 530]

Figure 5C:
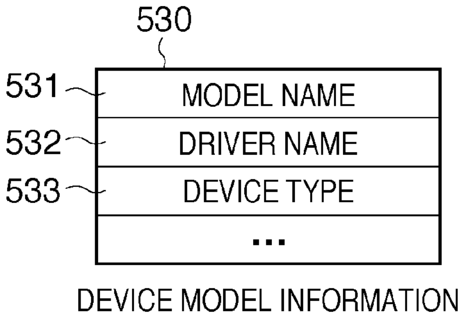

FIG. 5C is a table showing the device model information 530, which is managed by the system management server 105 and cached by the cache server 104. The device model information 530 is stored upon starting up the system management server 105. The device model information 530 is a value fixed for each device model, and is not updated upon job processing or document generation.

The device model information 530 includes a model name 531, driver name 532, and device type 533. The model name 531 is the model name of the printer 107. The model name 531 is fixed for the printer 107 and is not changed. The driver name 532 is the name of a printer driver with which the printer 107 with the model name 531 can print a job. In the device type 533, the printer 107 with the model name 531 is classified in accordance with the type of printable job. The device type 533 includes A3 color, A3 monochrome, A4 color, and A4 monochrome types. A3 color, for example, indicates a printer of a model corresponding to A3 paper size, A4 paper size, monochrome printing, and color printing. Note that the number of device types can be changed in accordance with the performance of a device model. That is, other device types may be defined in addition to the above-mentioned four device types.

[Printer Information 540]

Figure 5D:
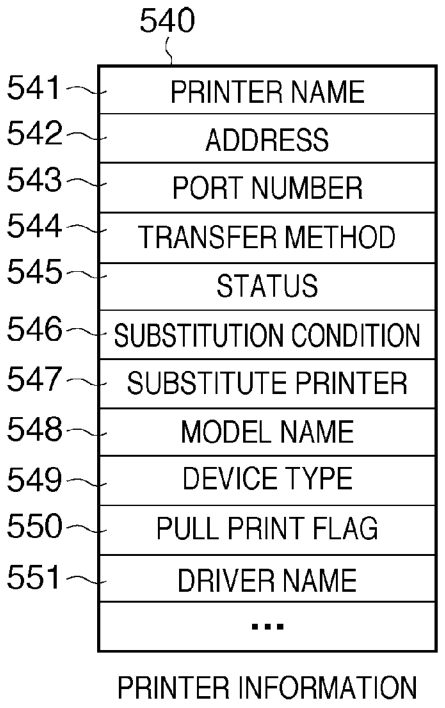

FIG. 5D is a table showing the printer information 540, which is managed by the system management server 105 and cached by the cache server 104. The print server 103 acquires the printer information 540 from the system management server 105, and stores it on the RAM 205. Although the printer information 540 is registered in the system management server 105 by the user, a detailed description of a registration method will not be given.

The printer information 540 includes a printer name 541, address 542, port number 543, transfer method 544, status 545, substitution condition 546, substitute printer 547, model name 548, device type 549, pull print flag 550, and driver name 551. The printer name 541 is a printer name given by the user. The address 542 is an IP address which can be connected to the printer 107, and has a specification such as IPv4 or IPv6. The port number 543 is a port number used to transmit print data to the printer 107. The transfer method 544 is a transfer method used to transmit print data to the printer 107. Examples of the transfer scheme include RAW and LPR (Line PRinter daemon protocol) in which data is continuously transmitted as a stream by TCP/IP, and a scheme of transmitting data by HTTP.

The status 545 indicates the status of the printer 107, and stores a notification from a schedule application 601. The substitution condition 546 is a condition for determining whether to execute substitute printing using another printer 107 as upon a failure/interruption of printing. A plurality of statuses 545 of the printer 107 can be designated as the substitution condition 546, and substitute printing is executed when the status 545 of the printer 107, printing of which is in progress, matches the substitution condition 546. The substitute printer 547 indicates the name of a substitution destination printer which executes substitute printing, and a plurality of printers can be registered as the substitute printer 547 by assigning priority levels to them. The model name 548 is designated by the user in printer registration. The device type 549 is set by referring to the model name 531 and device type 533 of the device model information 530 based on the model name 548. The pull print flag 550 is a flag for specifying a printer which prints from a pull print application 602 on the printer 107, and takes a true/false value. The pull print flag of the printer which prints from the pull print application 602 has a true value. The driver name 551 is a driver name corresponding to the printer. Printer information in which no driver name is set is also present.

<Configuration of Printer>

Figure 6:
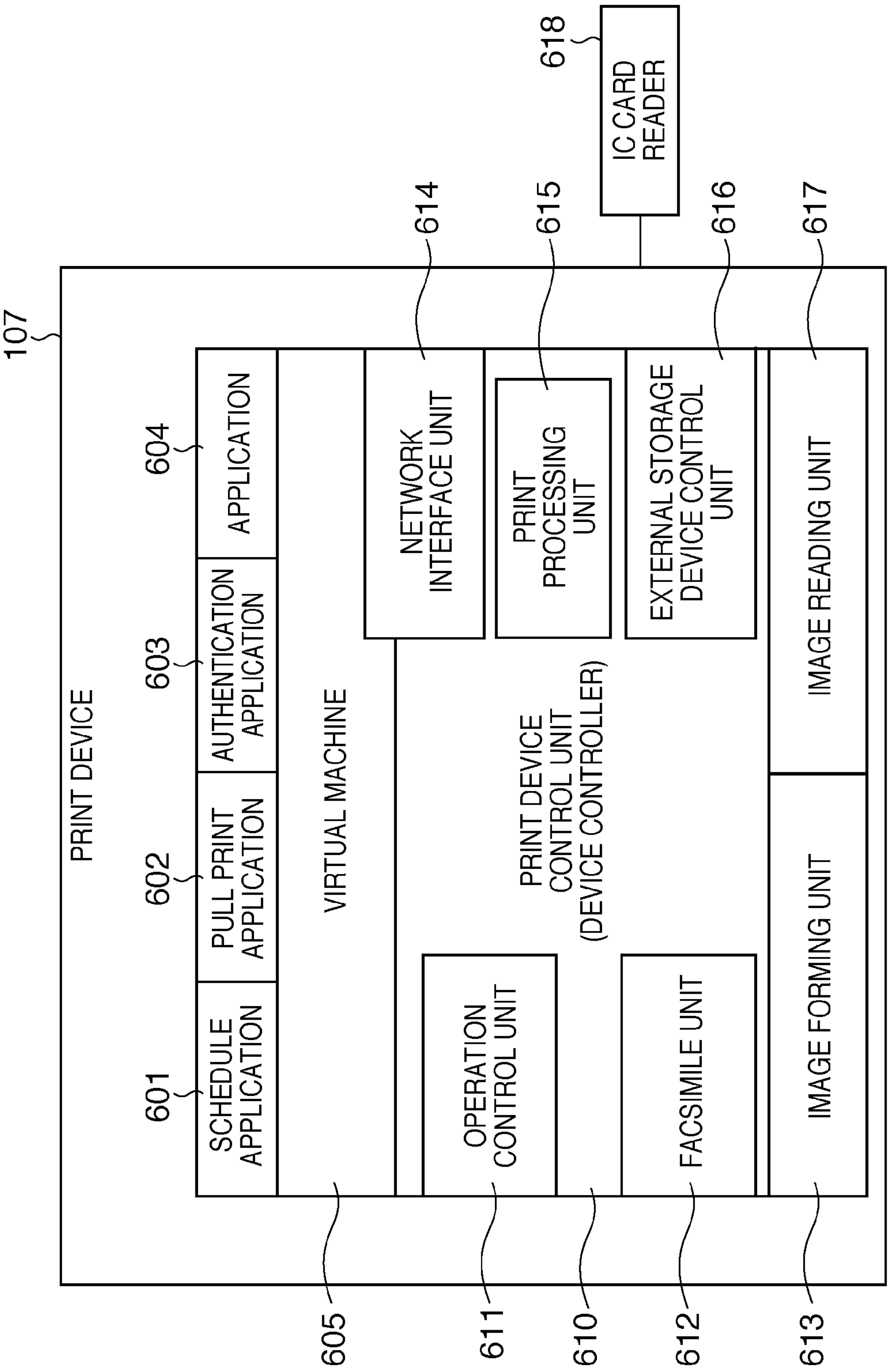
FIG. 6 is a block diagram showing the software configuration of the printer according to the embodiment.

FIG. 6 is a block diagram hierarchically showing the configuration of the printer 107. Note that each module is stored in the HDD 309 shown in FIG. 3, and is loaded into the RAM 308 and executed by the CPU 306, as described earlier.

Referring to FIG. 6, an image forming unit 613 executes a series of image forming processes such as paper handling and image transfer/fixation to form an image on a recording medium such as recording paper. The image forming unit 613 includes, for example, an inkjet printer or an electrophotographic image forming unit.

An image reading unit 617 includes, for example, a scanner, and optically reads and converts an original image into digital image information. Also, the image reading unit 617 outputs the digital image information to the image forming unit 613 to form an image, or passes it to, for example, a facsimile unit 612 or a network interface unit 614 to transmit it via a line.

A device controller 610 controls the operations of the image forming unit 613 and image reading unit 617 so that, for example, original information read by the image reading unit 617 is copied by the image forming unit 613. Also, the device controller 610 includes a network interface unit 614, a print processing unit 615, the facsimile unit 612, and an operation control unit 611, and controls information exchange among these units. The facsimile unit 612 transmits/receives a facsimile image, that is, transmits digital image information read by the image reading unit 617, or conversely decodes a received facsimile signal and performs a process of, for example, recording the decoded image using the image forming unit 613.

The operation control unit 611 performs control so that a signal corresponding to user operation which uses an operation panel of the operation unit is generated, and various types of data, messages, etc. are displayed on, for example, the operation unit (or the display unit). The print processing unit 615 controls an operation of, for example, processing print data input via the network interface unit 614, outputting it to the image forming unit 613, and printing it using the image forming unit 613. The network interface unit 614 controls data transmission/reception with another communication terminal via a communication line.

A virtual machine 605 is positioned at a level higher than the device controller 610, and can control the device controller 610. The network interface unit 614 can be directly used from both the device controller 610 and the virtual machine 605, and allows them to independently access an external network.

Furthermore, applications described in programming languages corresponding to APIs (Application Programming Interfaces) provided by the virtual machine 605 are present at a level higher than the virtual machine 605. These applications can indirectly act on the device controller 610 via the virtual machine 605, and also can operate the image forming unit 613 and image reading unit 617.

In this embodiment, the printer 107 includes, as the above-mentioned applications, the schedule application 601, the pull print application 602, and an authentication application 603. Each of these applications can be uninstalled from the virtual machine 605, or a new application 604 can be installed on the virtual machine 605. Although the above-mentioned applications are installed on the printer 107 in this embodiment, their functions may be implemented as hardware. The above-mentioned applications may be implemented as those on a computer communicably connected to the printer 107 as an external device.

An external storage device control unit 616 converts an image read by the image reading unit 617 into data in a format which can be stored in the image forming unit 613, and stores it in an external storage device. Also, the external storage device control unit 616 reads out the data stored in the external storage device and performs its print process via the image forming unit 613, or performs its network transmission to the outside via the network interface unit 614. In this embodiment, an IC card reader 618 is communicably connected to the printer 107 as a means for login to it, and the authentication application 603 can be notified of user account information via the IC card reader 618. As a matter of course, this login means may use another method such as the use of an ID card reader or an input from a device panel managed by the operation control unit 611.

[Schedule Application 601]

The schedule application 601 performs connection to the print server 103 and request acceptance from it, and notification of a change in status of a print job, which is sent from the device controller 610 via the virtual machine 605. The schedule application 601 is a module that schedules or manages a print job accepted from the print server 103, and performs control to sequentially execute printing in accordance with the schedule. Also, the schedule application 601 communicates with the device controller 610 via the virtual machine 605 to acquire a change in status of the printer 107, and notifies the print server 103 of the acquired information.

[Pull Print Application 602]

Figure 7:
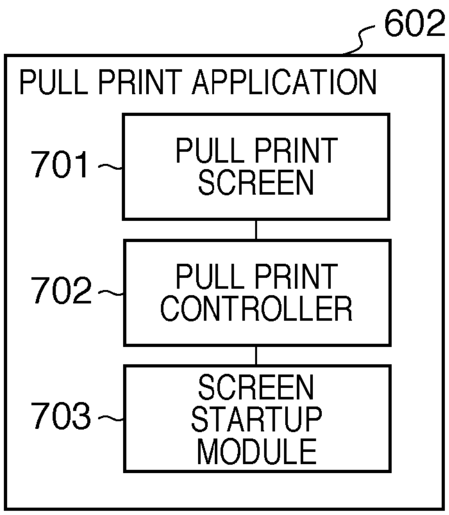
FIG. 7 is a block diagram showing the software configuration of a pull print application according to the embodiment.

FIG. 7 is a block diagram showing the configuration of the pull print application 602. The pull print application 602 includes a pull print screen 701, pull print controller 702, and screen startup module 703. The screen startup module 703 accepts a notification of login/logout from the authentication application 603, and notifies the pull print controller 702 of the accepted information. In response to a login notification, the pull print controller 702 initializes and generates the pull print screen 701. On the other hand, in response to a logout notification, the pull print controller 702 discards the respective generated windows.

[Authentication Application 603]

The authentication application 603 acquires IC card information from the IC card reader 618 communicably connected to the printer 107, and acquires a user ID from a user management table managed by itself. The user management table is a two-dimensional table including the IC card information and the user ID.

The authentication application 603 notifies the pull print application 602 of the acquired user ID. Also, the authentication application 603 detects logout of the user and notifies the pull print application 602 of the logout. Examples of logout detection methods include detection of pressing of a hard key of the printer 107, and automatic logout when the user has not operated for a predetermined time.

<Printing Based on Instruction from Client>

Figure 8:
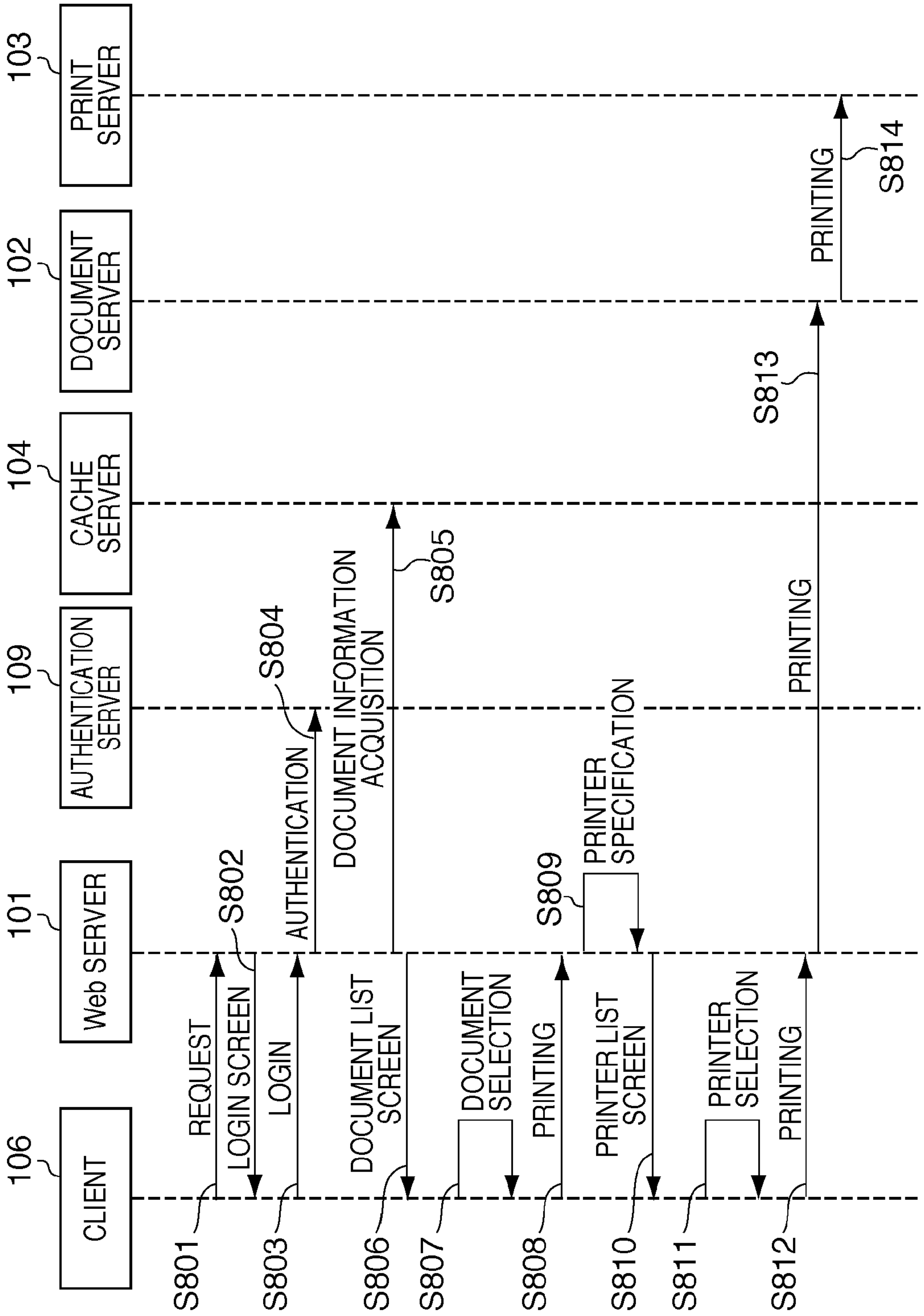
FIG. 8 is a sequence diagram of a print process based on an instruction from a client according to the first embodiment.

FIG. 8 is a sequence diagram showing the sequence of a process in which in the print system shown in FIG. 1, the user inputs information from the client 106, selects a document, and executes its printing.

FIG. 9A is a view showing a login screen 900 generated by the Web server 101 upon the first access to it. When the Web server 101 is accessed via the Web browser on the client 106 in step S801, the login screen 900 is sent back as a response (S802) and displayed on the Web browser. When the user inputs a user name and a password to a user name input portion 901 and a password input portion 902, respectively, on the login screen 900 displayed on the Web browser, and presses a login button 903, a login request is transmitted to the Web server 101 (S803). The login request (S803) includes the user name and password input by the user. In response to the login request, the Web server 101 transmits an authentication request to the authentication server 109, and the authentication server 109 authenticates the user (S804). The authentication request (S804) includes the user name and password input by the user.

Upon receiving an authentication success response (not shown) from the authentication server 109, the Web server 101 acquires a list of document information 500 of the user who has succeeded in the authentication from the cache server 104, and holds it on the RAM 205 (S805). The document information 500 acquired in this case is formatted in a list of the authenticated user name and the user name 503 registered in the document information 500, which match each other. The Web server 101 generates a document list screen shown in FIG. 9B based on the list of document information 500, and transmits it to the client 106 (S806).

A document list screen 910 shown in FIG. 9B is displayed on the Web browser on the client 106, and a document is selected by the user on the screen (S807). The user can simultaneously select more than one document using document selection check boxes in the document list 915. When the user presses a print button 911 after he or she selects documents on the document list screen 910, the Web browser issues a request to the Web server 101 to print the selected documents (S808). The print request (S808) includes a list of document IDs 501 selected by marking the document selection check boxes in the document list 915.

Upon accepting the print request (S808), the Web server 101 specifies document information 500 to be printed, using the list of document IDs 501 included in the print request. Next, the Web server 101 specifies a printer capable of printing the list of document information 500 to be printed (S809). Although not shown, the device model information 530 and printer information 540 that are used for the printer specification (S809) are acquired from the cache server 104, and stored on the RAM 308 of the Web server 101. These pieces of information may be acquired during the printer specification (S809) or periodically acquired/updated. Details of a method of specifying a printer capable of printing the document information 500 in step S809 will be described later.

When the Web server 101 specifies a printer capable of printing the document information 500 (S809), it generates a printer selection screen 920 shown in FIG. 9C based on the specified printer, and transmits it to the client 106. The printer selection screen 920 is displayed on the Web browser on the client 106. When the user selects a printer selection check box 923 on the printer selection screen 920, and presses a print button 921, a print request is transmitted from the Web browser to the Web server 101 (S812). The print request (S812) includes the printer name 541 selected via the printer selection check box 923.

Upon accepting the print request (S812), the Web server 101 instructs the document server 102 to execute printing (S813). A print request issued at that time (S813) includes the list of document IDs 501 and the printer name 541, which are included in the print requests issued from the client 106 in steps S808 and S812, respectively. Upon accepting the print request (S813), the document server 102 instructs the print server 103 to execute printing (S814). A print request issued at that time includes the list of document IDs 501 and the printer name 541. In accordance with the print request (S814), the print server 103 generates job information 520 and issues a print instruction to the printer 107.

FIG. 9A is a view showing the login screen 900 displayed on the client 106. The user inputs a user name to the user name input portion 901, inputs a password to the password input portion 902, and presses the login button 903, thereby transmitting the login request issued in step S803 to the Web server 101.

FIG. 9B shows the document list screen 910 displayed on the client 106. The user selects documents using the document selection check boxes in the document list 915, and presses the print button 911, thereby executing their printing. Alternatively, the user presses a print cancel button 912 to cancel printing of those documents. The document to be displayed switches from the current page to the next page by clicking a page switching button 914. The user logs out by pressing a logout button 913.

FIG. 9C shows the printer selection screen 920 displayed on the client 106. The user selects a printer using the printer selection check box 923, and presses the print button 921, thereby executing printing. Alternatively, the user presses a return button 922 to return the Web browser to the document list screen 910.

<Substitute Printing>

Figure 10:
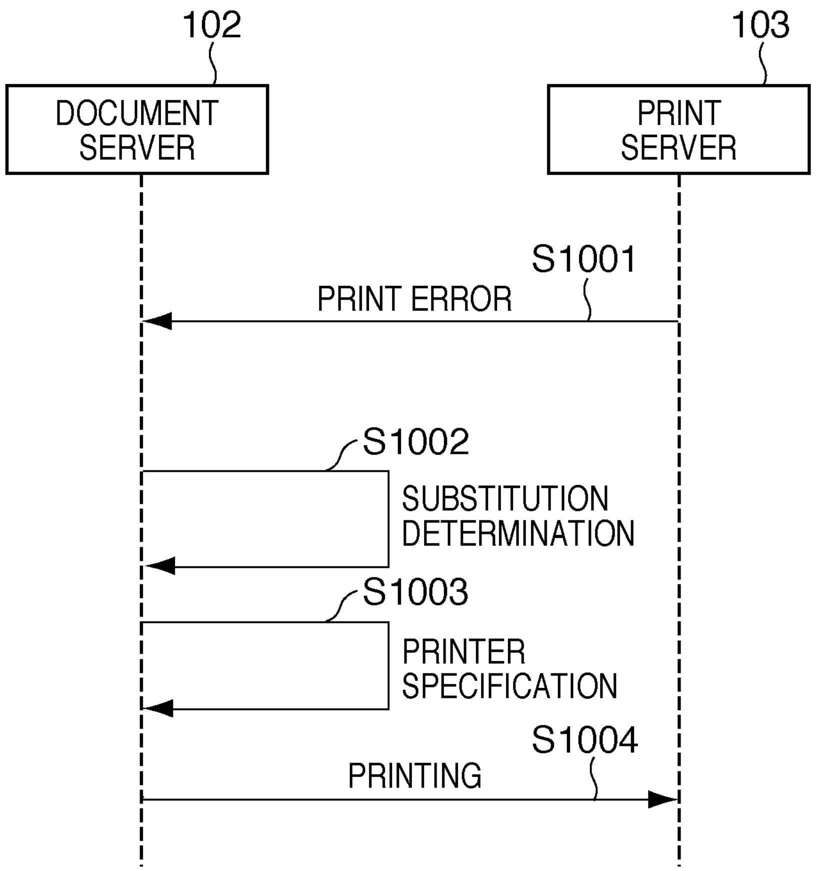
FIG. 10 is a sequence diagram in substitute printing according to the first embodiment.

FIG. 10 is a sequence diagram showing the sequence of a process in which substitute printing is executed if a job requested to be printed by the print server 103 has failed to be printed. The substitute printing means a function of executing printing by a backup printer if the previous printing has failed. FIG. 10 shows a process in which the print server 103 detects a print error, and a print request is issued to a backup printer.

The print server 103 is executing printing using the printer 107, and can detect a job print error. Examples of a method of detecting a print error include determination that the print server 103 cannot be connected to the printer 107, and notification of a print error by the schedule application 601 due to a paper jam in the process of delivery. Upon detecting a print error, the print server 103 notifies the document server 102 of the print error as a response to, for example, the sequence shown in FIG. 8 (S1001). This print error notification (S1001) includes a print error factor, the printer name 541, and the document ID 522, and the document server 102 can specify the job information 520 and printer information 540 based on this notification.

In response to the print error notification (S1001), the document server 102 performs substitution determination (S1002). The substitution determination is performed under the substitution condition 546 set in the printer information 540 of a printer that has encountered a print error, and substitute printing is executed if the substitution condition 546 matches the error factor sent from the print server 103. If it is determined by the substitution determination (S1002) that the error factor satisfies the substitution condition 546, the document server 102 specifies a printer to substitute (S1003). A substitution destination printer is selected from substitute printers 547 for the printer that has printed. Among the substitute printers 547, a printer capable of printing the print job that has resulted in a print error is determined as a substitution destination. Details of the determination in step S1003 as to whether the job that has resulted in a print error can be printed by the substitute printer 547 will be described later. When the document server 102 specifies a substitution destination printer (S1003), it issues a print request to the print server 103 (S1004). The print request (S1004) includes the document ID of the job that has resulted in a print error, and the printer name of the substitution destination printer. After that, the print server 103 issues a print instruction to the substitution destination printer.

<Specification of Printer Capable of Printing Job>

Figure 11:
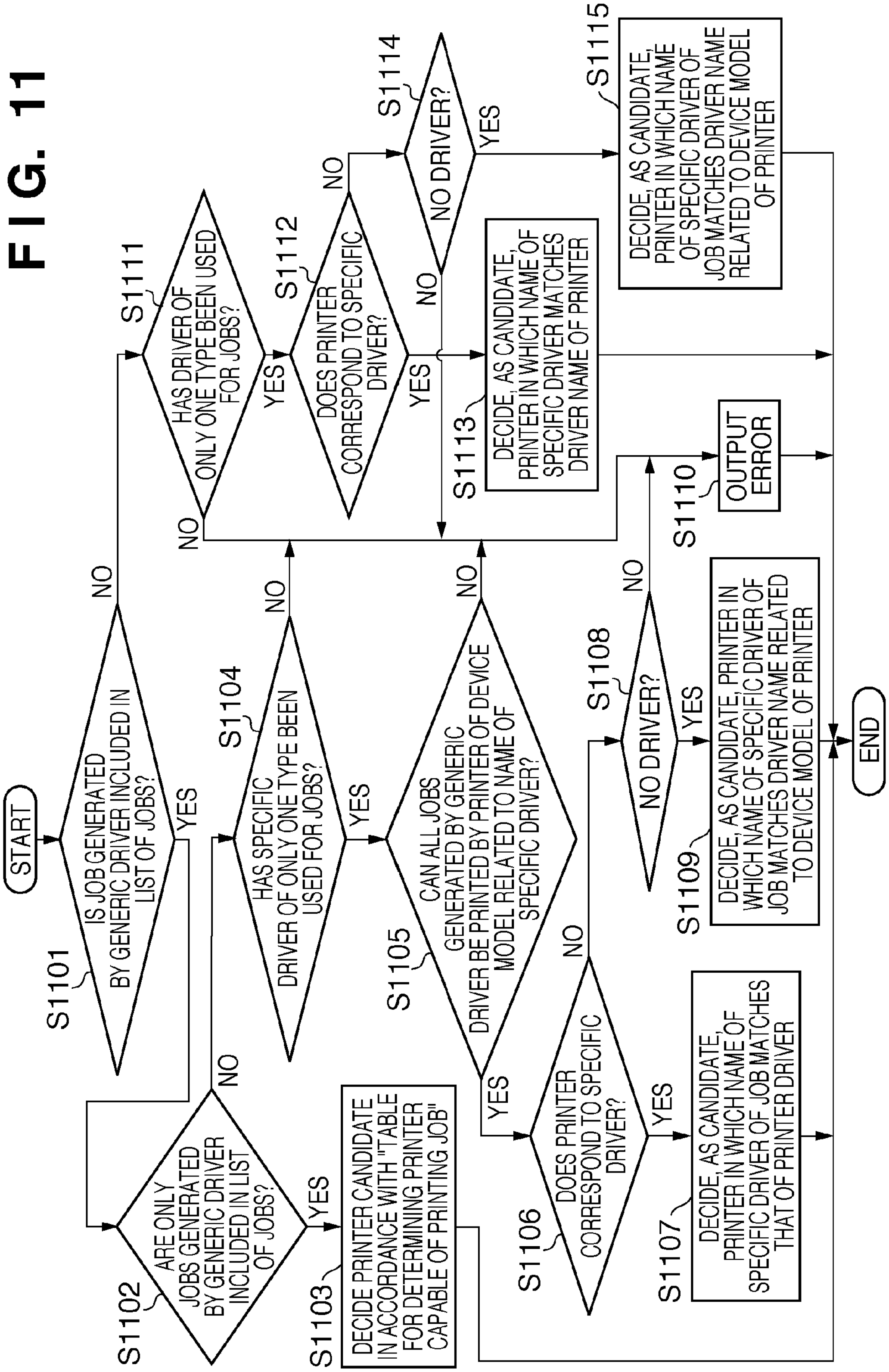
FIG. 11 is a flowchart showing the sequence of a process for specifying a printer capable of printing a job according to the first embodiment.

FIG. 11 is a flowchart for specifying a printer capable of printing a job. This sequence is used upon receiving a print instruction from the client 106, and in substitute printing, as described earlier. Upon receiving a print instruction from the client 106, the Web server 101 uses this sequence to specify a printer capable of printing the selected job (S809). In substitute printing, this sequence is used to specify, by the document server 102, a printer capable of printing the job that has resulted in a print error among the substitution destination printers (S1003). The procedure shown in the flowchart of FIG. 11 is stored in the HDD 206 of each of the Web server 101 and document server 102, and is loaded into the RAM 205 and executed by the CPU 203, as described earlier.

The process sequence of the Web server 101 in printing based on an instruction from the client will be exemplified. The Web server 101 determines whether a job (print data) generated by a generic driver is included in a list of jobs for which the print request (S808) is accepted (S1101). The determination in step S1101 is based on whether the driver name 505 of the document matches the name of the generic driver. If it is determined in step S1101 that a job generated by a generic driver is included in the list of jobs requested to be printed, it is determined in step S1102 whether all jobs are jobs (print data) generated by the generic driver, based on the driver name 505, as in step S1101. If it is determined in step S1102 that all jobs are jobs (print data) generated by the generic driver, the process advances to step S1103, in which a printer capable of printing the jobs is determined based on "a table for determining a printer capable of printing a job 1200" shown in FIG. 12A. This process sequence then ends. Although the driver name is used as a determination criterion in this sequence, another driver information may be used as long as it can be used to identify a driver. In this case, corresponding information must be held in the data.

"The table for determining a printer capable of printing a job 1200" will be described herein. The printer determination table 1200 is an association table for determining whether printing is possible, by comparing the device type 506 of a job with the device type 549 of a printer. A job corresponding to an A3 color device type can be printed by a printer corresponding to an A3 color device type (1201). A job corresponding to an A4 color device type can be printed by a printer corresponding to an A3 color or A4 color device type (1202). A job corresponding to an A3 monochrome device type can be printed by a printer corresponding to an A3 color or A3 monochrome device type (1203). A job corresponding to an A4 monochrome device type can be printed by a printer corresponding to an A3 color, A4 color, A3 monochrome, or A4 monochrome device type (1204). It is determined whether printing is possible, using "the table for determining a printer capable of printing a job 1200" based on device types 506 of all jobs requested to be printed in step S1103, and device types 549 of all printers registered in the print system. A printer capable of printing all jobs requested to be printed is specified. In this embodiment, the printer determination table 1200 is an association table in which four types of jobs are associated with printers. However, when device types are added in accordance with, for example, the functions of printer devices, the determination table 1200 can also be newly defined in accordance with them.

If it is determined in step S1102 that not all jobs requested to be printed are jobs (print data) generated by the generic driver, the process advances to step S1104, in which it is determined whether a specific driver of only one type has been used. This determination is done by referring to driver names 505 of the documents. If specific drivers of a plurality of types have been used, it is determined that no printer capable of printing is present, and an error is output (S1110). This process sequence then ends. If it is determined in step S1104 that a specific driver of only one type has been used, the device model is specified based on the driver name of the specific driver of one type. The device model has the model name 531 of printers with the same driver name 532 in the device model information 530. It is determined whether the jobs generated by the generic driver among the jobs requested to be printed can be printed by the printer with the specified model name 531 (S1105). This determination is done using "the table for determining a printer capable of printing a job 1200" based on the device types 506 of all jobs generated by the generic driver and the device type 533 of the model name 531. Details of the determination based on "the table for determining a printer capable of printing a job 1200" are as described above.

If it is determined in step S1105 that the jobs generated by the generic driver cannot be printed by the printer of the device model related to the specific driver, it is determined that no printer can print the jobs, and an error is output (S1110). This process sequence then ends.

If it is determined in step S1105 that printing is possible, the process advances to step S1106, in which the next determination operation is performed. In step S1106, printer information 540 in which the device model related to the specific driver of one type matches the model name 548 is specified, and it is determined whether the driver name 551 is that of a specific driver. If it is determined in step S1106 that the driver name 551 is that of a specific driver, it is confirmed whether this specific driver is the same as the specific driver which has generated the jobs requested to be printed, and, if YES is determined in this confirmation, a printer corresponding to the specific driver is decided as a candidate for a printer capable of printing the requested jobs (S1107). This process sequence then ends.

If it is determined in step S1106 that the driver name 551 is not of a specific driver, the process advances to step S1108. In step S1108, it is determined whether printer information 540 which is specified in the same way as in step S1106 and designates no driver by a driver name is present. If it is determined in step S1108 that the printer information 540 designates no driver, the process advances to step S1109. In step S1109, if the driver name related to the device model of the printer information matches that of the jobs which are requested to be printed and generated by the specific driver, a printer corresponding to this printer information is decided as a candidate for a printer capable of printing the jobs. This process sequence then ends. If it is determined in step S1108 that all printer information designate drivers, it is determined that no printer capable of printing the jobs is present, and an error is output (S1110). This process sequence then ends.

If it is determined in step S1101 that jobs requested to be printed include no job generated by a generic driver, the number of driver names of the jobs is determined (S1111). If it is determined in step S1111 that the jobs have a plurality of driver names, it is determined that no printer capable of printing the jobs is present, and an error is output (S1110).

If it is determined in step S1111 that a driver of one type has been used, the process advances to step S1112. In step S1112, printer information 540 having a driver name 551 which matches that of a specific driver is determined. In step S1113, a printer corresponding to printer information which is determined to designate a specific driver and in which the name of the specific driver matches the driver name of the jobs is decided as a candidate for a printer capable of printing the jobs. This process sequence then ends. If it is determined in step S1112 that no printer information which designates a specific driver is present, the process advances to step S1114. In step S1114, it is determined whether printer information 540 which designates no driver by a driver name is present. If it is determined in step S1114 that the printer information 540 designates no driver, the process advances to step S1115. If the driver name related to the device model of the printer information matches that of the jobs which are requested to be printed and generated by the specific driver, a printer corresponding to this printer information is decided as a candidate for a printer capable of printing the jobs (S1115). This process sequence then ends. If it is determined in step S1114 that all printer information designate drivers, it is determined that no printer capable of printing the jobs is present, and an error is output (S1110). This process sequence then ends.

As described above, a printer capable of printing jobs (print data) stored in a server can be specified upon a print request based on the device types and driver names of the jobs even if the jobs include a job (print data) generated by a generic driver. Also, in printing, the user can designate a printer which prints one or more designated jobs from a plurality of printers specified from setting of these jobs.

Second Embodiment

The sequence of a process in which a print instruction is issued from a client has been described in the first embodiment. A case in which a print instruction is issued from a printer will be described next as the second embodiment. Note that a description of details which overlap those in the first embodiment will not be given, and only differences from the first embodiment will be described.

<Printing Based on Instruction from Printer>

Figure 13:
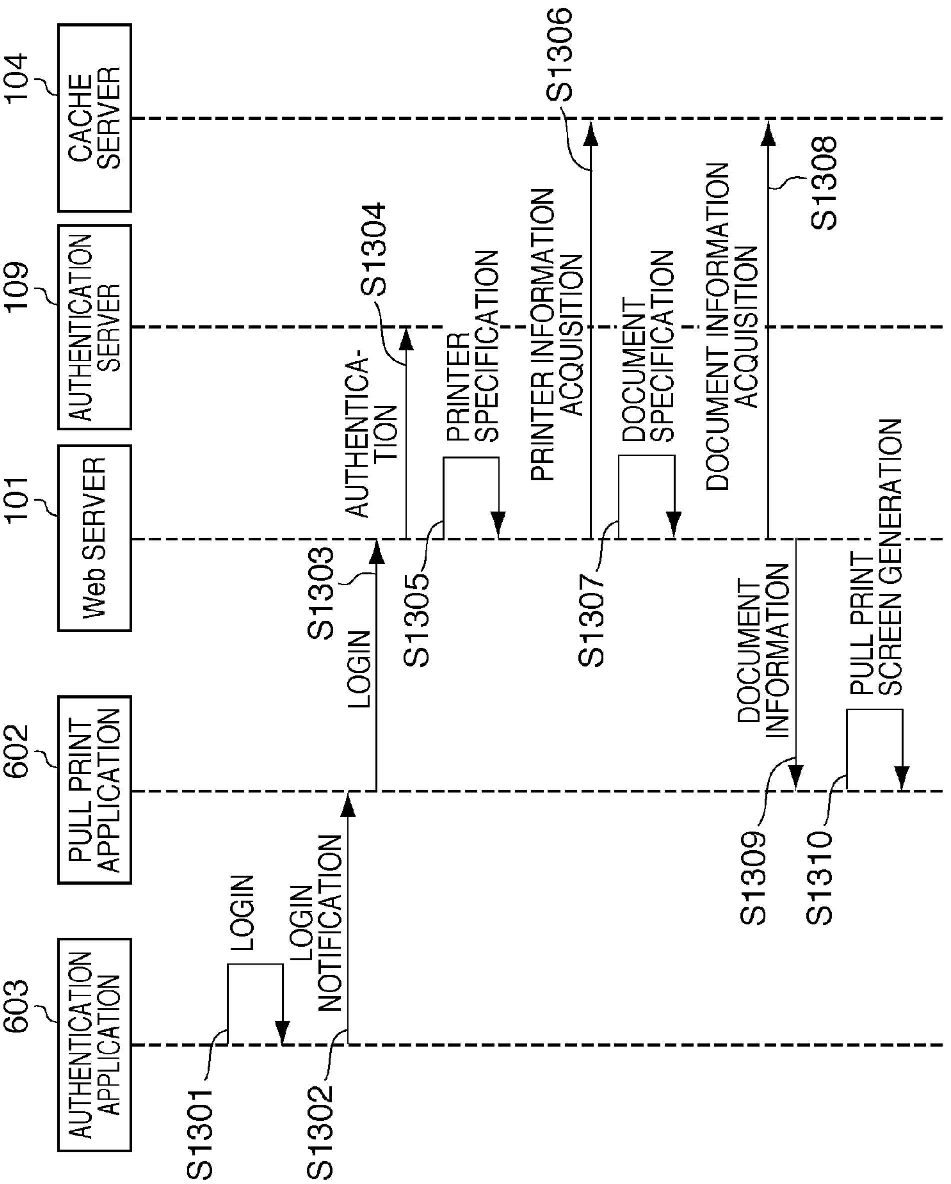
FIG. 13 is a sequence diagram of a print process based on an instruction from a printer according to the second embodiment.

FIG. 13 shows a sequence for displaying a screen by a pull print application 602 as the user logs in from an IC card reader 618.

In step S1301, in response to login from the IC card reader 618, an authentication application 603 acquires a user account (user name), and notifies the pull print application 602 of the login (S1302). The pull print application 602 accepts the login using a pull print controller 702.

In step S1303, the pull print application 602 logs in to a Web server 101. At this time, the pull print application 602 uses the above-mentioned user account (user ID) acquired from the authentication application 603 as login information. Also, the pull print application 602 notifies the Web server 101 of the IP address of a printer 107 as information to specify a printer. A method of inputting an ID or a password on the screen can also be used instead of using the IC card reader 618.

In response to the login notification from the pull print application 602, the Web server 101 authenticates the user using an authentication server 109 (S1304). The authentication server 109 authenticates the user by referring to user information registered in advance. Although not shown, if the user succeeds in the authentication, the authentication server 109 sends back, as authentication information, user information and domain group information to which the user belongs. However, if the user fails in authentication, the authentication server 109 sends back failure information, and the user fails in login.

If the user succeeds in the authentication, the Web server 101 specifies a printer which has an IP address matching that of the printer 107 sent upon the login (S1303) and has a pull print flag 550 with a true value (S1305). The Web server 101 acquires printer information 540 of the specified printer from a cache server 104 (S1306). Although steps S1305 and S1306 are shown as separate processes in the sequence of FIG. 11 for the sake of descriptive convenience, they are simultaneously executed to specify and acquire a document by searching a database stored in the cache server 104.

A document which can be printed by the specified printer is specified (S1307) to acquire a list of document information 500 from the cache server 104. Although steps S1307 and S1308 are shown as separate processes in the sequence of FIG. 15 for the sake of descriptive convenience, they are simultaneously executed to specify and acquire a document by searching a database stored in the cache server 104. Details of a method of specifying a printable job will be described later. When the pull print application 602 acquires (S1309) a list of document information 500 which can be printed by the printer 107, it generates a pull print screen 701 (S1310).

FIG. 14 shows an example of the pull print screen 701 which is generated by the pull print application 602 and displayed on a panel of the printer 107. The user can start to print using the printer 107 having its panel being operated by selecting a document using a document selection check box in the document list 1402 and pressing a print button 1405. The user also can browse details of the selected documents by pressing a detail button 1403 if only one document is selected. The document selected via the document selection check box in the document list 1402 is deleted by pressing a delete button 1404. Also, a user name sent from the authentication application 603 is displayed in a portion 1401.

<Specification of Document which can be Printed by Printer>

Figure 15:
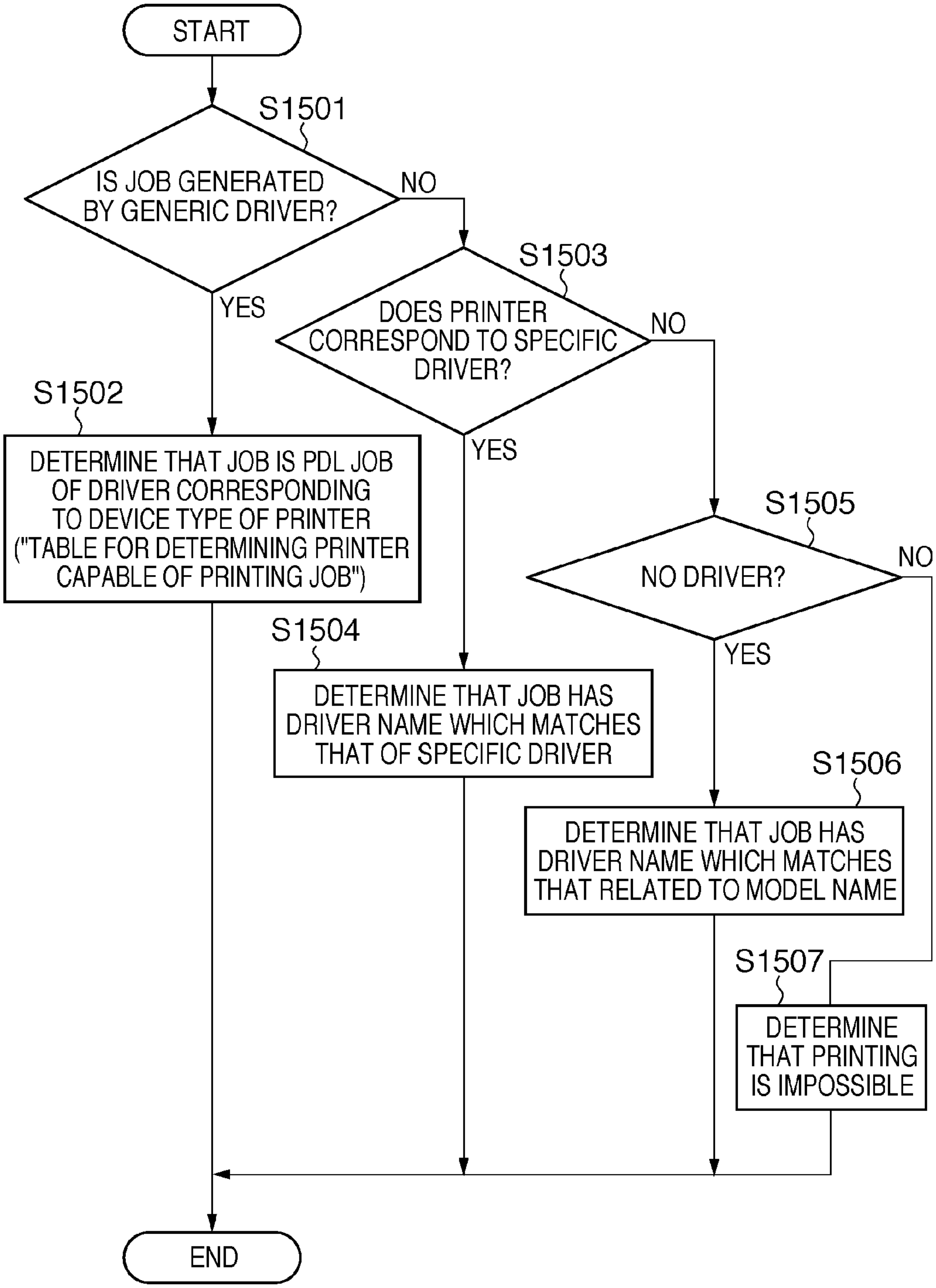
FIG. 15 is a flowchart showing the sequence of a process for specifying a printable job according to the second embodiment.

FIG. 15 is a flowchart for specifying a job which can be printed by a printer in response to a document acquisition request. This sequence is used to specify a document which can be printed by a printer specified in step S1305 in response to a login request from the pull print application 602 by the Web server 101 in printing based on an instruction from the printer (S1307). Note that the procedure shown in the flowchart of FIG. 15 is stored in an HDD 206 of the Web server 101, and is loaded into a RAM 205 and executed by a CPU 203, as described earlier.

First, in step S1501, it is determined whether the job is generated by a generic driver, based on a driver name 505 set in the document information 500. If it is determined that the job is generated by a generic driver, the process advances to step S1502. In step S1502, it is determined whether printing is possible, using "a table for determining a printer capable of printing a job 1210" shown in FIG. 12B based on a device type 549 of the printer information 540 of the printer which has issued the print request, and a device type 506 of the document (S1502). This process sequence then ends.

"The table for determining a printer capable of printing a job 1210" will be described herein. In the job determination table 1210, a job which can be printed by a printer corresponding to an A3 color device type is an A3 color, A4 color, A3 monochrome, or A4 monochrome job (1211). A job, which can be printed by a printer corresponding to an A4 color device type, is an A4 color or A4 monochrome job (1212). A job which can be printed by a printer corresponding to an A3 monochrome device type is an A3 monochrome or A4 monochrome job (1213). A job, which can be printed by a printer corresponding to an A4 monochrome device type, is an A4 monochrome job (1214).

If it is determined in step S1501 that the job is not generated by a generic driver, the process advances to step S1503. In step S1503, it is determined whether a specific driver is set for a driver name 551 of the printer information 540. If it is determined in step S1503 that a specific driver is set, it is determined that a job with the driver name 505, which matches that of the specific driver, is printable (S1504). This process sequence then ends.

If it is determined in step S1503 that no specific driver is set, the process advances to step S1505. In step S1505, it is determined whether printer information designates a driver by the driver name 551. If it is determined in step S1505 that the printer information designates no driver, it is determined that a job with the driver name 505 which matches the driver name 532 that can be specified by the model name 548 of the printer information is printable (S1506). This process sequence then ends. If it is determined in step S1505 that the setting contents of the driver name 551 of the printer are other information, it is decided that the job is not printable (S1507). This process sequence then ends.

As described above, a printer capable of printing a job stored in a print server is specified based on the device type and driver name of the job, and this makes it possible to specify a job which can be printed by a printer which has issued a print request.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298834, filed Dec. 28, 2009, which is hereby incorporated by reference herein in its entirety.

What is claimed is:

1. An information processing apparatus which stores a job generated by a printer driver in memory unit, and specifies a printer to execute a print process of the stored job in accordance with a request from a client, comprising:

a storage unit for receiving a job generated by a generic driver corresponding to printers of a plurality of device types, and a job generated by a specific driver corresponding to a specific printer, and storing the received jobs in the memory unit;

a management unit for managing printer information including a device type of a printer;

a determination unit for determining whether a job for which a print instruction is issued by the request is generated by a generic driver;

a device type specification unit for specifying a device type of a printer capable of printing the job for which the print instruction is issued, based on setting information of the job, when said determination unit determines that the job is generated by the generic driver; and a printer specification unit for specifying, as the printer capable of printing the job for which the print instruction is issued, a printer corresponding to the printer information which is managed by said management unit and matches the device type specified by said device type specification unit, wherein said printer specification unit specifies, as the printer capable of printing the job for which the print instruction is issued, a printer corresponding to a specific driver which has generated the job based on a driver name of the specific driver, when it is determined that the job for which the print instruction is issued is generated by the specific driver.

2. The apparatus according to claim 1, wherein the device type includes at least one of a type of a printer which corresponds to an A3 size and an A4 size and is capable of color printing and monochrome printing, a type of a printer which corresponds to an A4 size and is capable of color printing and monochrome printing, a type of a printer which corresponds to an A3 size and an A4 size and is incapable of color printing, and a type of a printer which corresponds to an A4 size and is incapable of color printing.

3. The apparatus according to claim 1, wherein when said determination unit determines that all of a plurality of jobs for which the print instruction is issued are generated by the generic driver, said device type specification unit specifies a device type of a printer capable of printing the plurality of jobs for which the print instruction is issued, based on setting information of the plurality of jobs, and said printer specification unit specifies a printer corresponding to printer information which is managed by said management unit as the printer capable of printing the plurality of jobs for which the print instruction is issued, and matches the specified device type.

4. The apparatus according to claim 1, wherein when said determination unit determines that the plurality of jobs for which the print instruction is issued include a job generated by a generic driver and a job generated by a specific driver, said device type specification unit specifies a device type of a printer capable of printing the job generated by the generic driver, and said printer specification unit specifies, as the printer capable of printing the job generated by the generic driver, a printer corresponding to printer information which is managed by said management unit and matches the specified device type, and specifies, if the printer specified to be capable of printing the job generated by the generic driver matches a printer corresponding to driver information of the job generated by the specific driver, the specified printer as the printer capable of printing the jobs for which the print instruction is issued.

5. The apparatus according to claim 1, wherein when said determination unit determines that the plurality of jobs for which the print instruction is issued include a job generated by a generic driver and a plurality of jobs generated by a specific driver, said printer specification unit specifies that no printer capable of printing the plurality of jobs for which the print instruction is issued is present if pieces of driver information of the plurality of jobs generated by the specific driver correspond to different printers, and the client is notified of information indicating that no printer capable of printing the plurality of jobs for which the print instruction is issued is present.

6. The apparatus according to claim 1, wherein the client is notified of the printer specified by said printer specification unit, and a printer selected by the client executes a print process of the job for which the print instruction is issued.

7. A control method for an information processing apparatus which stores a job generated by a printer driver in memory unit, and specifies a printer to execute a print process of the stored job in accordance with a request from a client, comprising:

a storage step of receiving a job generated by a generic driver corresponding to printers of a plurality of device types, and a job generated by a specific driver corresponding to a specific printer, and storing the received jobs in the memory unit;

a management step of managing printer information including a device type of a printer;

a determination step of determining whether a job for which a print instruction is issued by the request is generated by a generic driver;

a device type specification step of specifying a device type of a printer capable of printing the job for which the print instruction is issued, based on setting information of the job, when it is determined in the determination step that the job is generated by the generic driver; and a printer specification step of specifying, as the printer capable of printing the job for which the print instruction is issued, a printer corresponding to the managed printer information which matches the device type specified in the device type specification step, wherein in the printer specification step, a printer corresponding to a specific driver which has generated the job for which the print instruction is issued is specified as the printer capable of printing the job based on a driver name of the specific driver, when it is determined that the job for which the print instruction is issued is generated by the specific driver.

8. A non-transitory computer-readable medium storing a program causing a computer to function as:

a storage unit for receiving a job generated by a generic driver corresponding to printers of a plurality of device types, and a job generated by a specific driver corresponding to a specific printer, and storing the received jobs in a memory unit;

a management unit for managing printer information including a device type of a printer;

a determination unit for determining whether a job for which a print instruction is issued by the request is generated by a generic driver;

a device type specification unit for specifying a device type of a printer capable of printing the job for which the print instruction is issued, based on setting information of the job, when said determination unit determines that the job is generated by the generic driver; and a printer specification unit for specifying, as the printer capable of printing the job for which the print instruction is issued, a printer corresponding to the printer information which is managed by said management unit and matches the device type specified by said device type specification unit, wherein said printer specification unit specifies, as the printer capable of printing the job for which the print instruction is issued, a printer corresponding to a specific driver which has generated the job based on a driver name of the specific driver, when it is determined that the job for which the print instruction is issued is generated by the specific driver.

* * * * *